J. M. CAMERON.
MINE CAR TRUCK.
APPLICATION FILED MAY 27, 1921.
1,419,218.
Patented June 13, 1922.
2 SHEETS—SHEET 1.
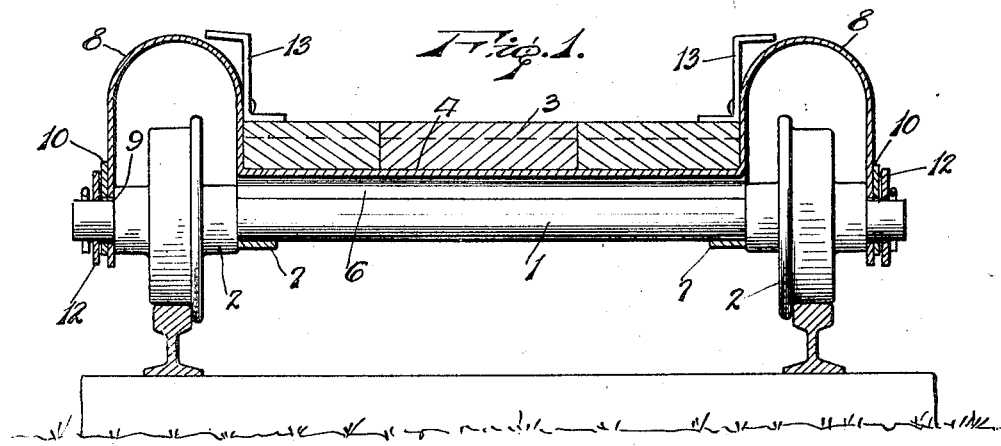
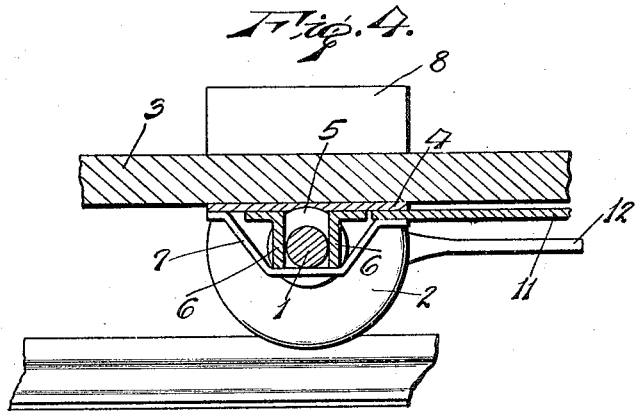
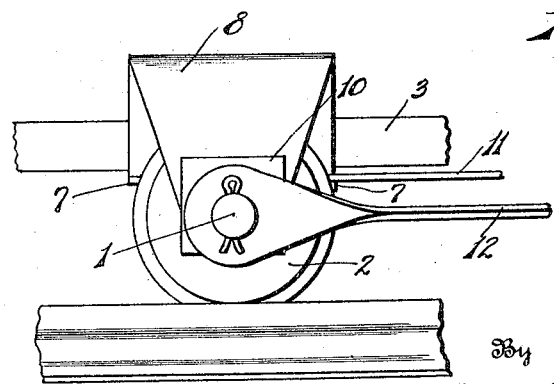
Inventor
J. M. Cameron.
By
Lacey & Lacey, Attorneys J. M. CAMERON.
MINE CAR TRUCK.
APPLICATION FILED MAY 27, 1921.
1,419,218.
Patented June 13, 1922.
2 SHEETS—SHEET 2.
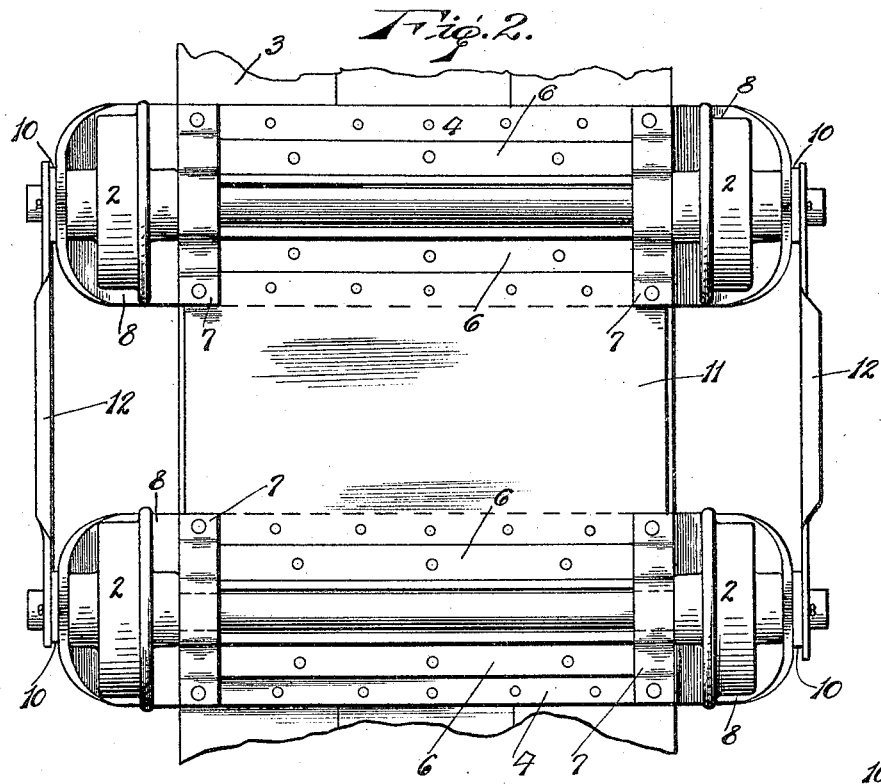
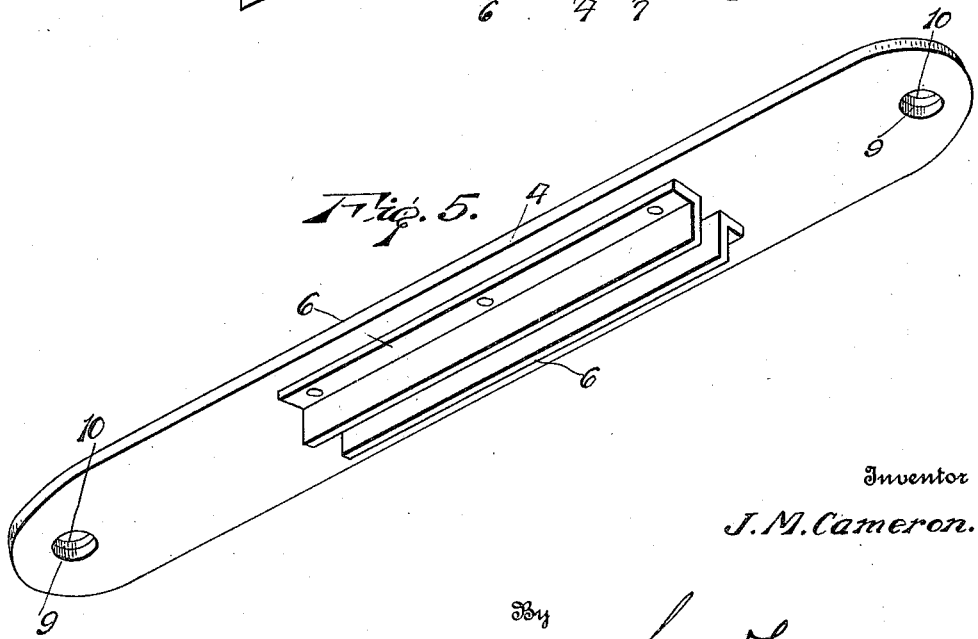
Inventor
J. M. Cameron.
By Lacey & Lacey, Attorneys

UNITED STATES PATENT OFFICE.

JOHN M. CAMERON, OF DORCHESTER, VIRGINIA.

MINE-CAR TRUCK.

1,419,218. Specification of Letters Patent. Patented June 13, 1922.

Application filed May 27, 1921. Serial No. 473,134.

*To all whom it may concern:*

Be it known that I, JOHN M. CAMERON, a citizen of the United States, residing at Dorchester, in the county of Wise and State of Virginia, have invented certain new and useful Improvements in Mine-Car Trucks, of which the following is a specification.

This invention relates to mine cars and has special reference to the means for mounting the body of the car upon the wheels and the axle. So far as I am aware, all mine cars have heretofore employed a rigid construction because the service required has proven too severe for the spring or flexible mountings which have been heretofore suggested. The tracks in mines are of narrow gage and the curves are necessarily of small radius so that the car truck is necessarily built with a small distance between the axles and with short axles but the car bodies are relatively very large so as to carry a good load and, therefore, there is a great overhang at each end of the car as well as on both sides. This overhanging construction places tremendous strain on the car body, the wheels and the truck mechanism when rounding curves or passing over bad track so that flexible construction has heretofore failed. The tracks in mines are also laid without ballasting and are fastened in any convenient manner so that they soon become distorted and frequently a car will be required to run on three wheels or even two wheels inasmuch as the bad dips or rises in the track rails will prevent all the wheels being upon the rails at the same time owing to the rigid construction of the body and the truck and the rigid mounting of the axles upon the truck and body. This inability of all the wheels to remain upon the rails causes frequent derailments and, even when derailments do not occur, the strain upon the car is so severe that frequent repairs are necessary.

The objects of my invention, therefore, are to provide a car truck having more or less flexibility without any sacrifice of strength; to provide a mine car truck of such construction that the wheels will follow the irregularities and dips in the track without leaving the rails; to provide a mine car truck in which the load will be carried by the axle on each side of each wheel, instead of between the wheels only, thereby increasing the strength of the truck; to provide a mine car truck in which the weight of the load will be so distributed upon the axle that an axle of less diameter than has been heretofore necessary may be used, and to improve generally the construction and arrangement of the parts of a mine car truck to the end that the durability and efficiency of the same will be increased. These several stated objects and such other objects as will incidentally appear in the course of the following description are attained in such a construction as is illustrated in the accompanying drawings and the invention resides in certain novel features which will be particularly pointed out in the claims following the description.

In the drawings—

Figure 1 is a transverse section of a car truck embodying my improvements;

Fig. 2 is a bottom plan view of the same;

Fig. 3 is a side elevation of one end of the truck;

Fig. 4 is a longitudinal section of one end of the truck;

Fig. 5 is a detail perspective view of a plate employed as an axle mounting and hanger, showing the same as it appears before its ends are given their final configuration.

The axle 1 is of the usual formation, although it may be of less diameter than is now generally employed and the wheels 2 are mounted loosely upon the axle adjacent the ends of the same. Extending under the floor 3 of the car body is a hanger plate 4 which may be provided along its medial longitudinal line with a shallow groove 5 to receive the axle when the car is loaded. To the under side of this plate 4 and extending longitudinally thereof, I secure the angle bars 6 which are spaced apart a distance slightly greater than the diameter of the axle with their vertical webs or flanges disposed in front and in rear of the axle respectively, as clearly shown in Fig. 4, the said vertical webs or flanges thereby constituting a channel in which the axle may have vertical play within definite limits. To prevent the axle dropping from between the angle bars, straps 7 are provided, the intermediate portions of the straps passing across the lower edges of the vertical webs of the angle bars and bridging the channel defined by said bars and the ends of the straps being riveted or otherwise firmly secured to the hanger plate 4, as will be readily understood upon reference to Figs. 2 and 4. The length of the hanger plate 4 is greater than the width of the car floor or bottom 3 and the end portions of said plate beyond the angle bars 6 are bent into arch form, as shown at 8, so that they will extend over the car wheels and have their extremities disposed vertically at the outer sides of the wheels and provided at their extremities with openings 9 to receive the ends of the axle. The hanger plate is preferably constructed of high tensile steel so that the arched portions thereof will be somewhat resilient and may yield to a heavy load, so that an empty car or a car with a light load will have its floor or bottom supported in spaced relation to the axle, as indicated in Figs. 1 and 4, and the weight of the car will be carried by the ends of the axles outside the wheels. When the car is loaded, however, the resilient arches 8 will yield to the weight of the load and the intermediate portion of the hanger plate 4 will then drop so as to rest upon the axle and the load will consequently be distributed through the entire length of the axle. I am thus enabled to use an axle of less diameter than has heretofore been necessary. The hanger plate 4 is obviously of rather thin material and to prevent excessive wear upon the ends of the axle, I secure reinforcing plates 10 to the extremities of the hanger plate at the outer sides of the same which will provide a more extended bearing upon the axle and thereby prevent cutting of the same by the edges or wall of the opening 9. To further reinforce the truck, I employ a connecting plate 11 which is disposed below the floor 3 of the car and extends between the two hanger plates 4 of the truck, the front and rear ends of said plate being rigidly secured to the under sides of the intermediate portions of the said hanger plates, and the inner ends of the strap 7 may be secured to the under sides of said plates, as shown in Fig. 4. I also employ tie bars 12 which are preferably pressed steel plates having their intermediate portions flat horizontally and their end portions flat and extended vertically so as to fit about the extremities of the axle. The formation of these tie bars imparts considerable flexibility to them without detracting from their strength and they serve to prevent spreading of the extremities of the axle, as will be readily understood.

In Fig. 1, I have indicated the brackets 13 which are employed to connect the sides of the car body to the floor or bottom thereof but as the body itself forms no part of my invention I have deemed illustration of the same unnecessary.

It will be readily seen from the foregoing description, taken in connection with the accompanying drawings, that I have provided a truck for mine cars in which the axles will have free vertical movement along their entire length within definite limits and a portion of the load will be carried by the ends of the axles outside the wheels, while the remainder of the load will be evenly distributed over the length of the axles between the wheels. The coupling plates 11 and the tie bars 12 reinforce the truck against shocks without interfering at all with the vertical movement of the axle or of the truck relative to the axle so that the wheels may remain on the track rails under all conditions and the axle is prevented from leaving the truck even if the car should be overturned. When the car is running empty or with a light load, the weight will be carried by the resilient arches at the ends of the axles and any desired flexibility of these arches may be obtained by varying the shape or size of the same. When the car is fully loaded, the intermediate portion of the hanger plate will rest upon the axle and should any one wheel of the truck encounter a dip or low spot in the track, the load on that particular wheel will be carried by the spring arch without causing a tipping of the car body so that the distorted strains imposed upon the car body will be reduced to a minimum. The tie bars extending between the ends of the axles at each side of the truck aid the resilient arches in maintaining the normal level of the car body when the truck is passing over an irregular track and the possibly greater cost of substituting my improved truck for the trucks now generally employed is more than offset by the saving in the cost of repairs and maintenance effected by its use.

It will be readily noted that the axle in my improved truck is received in a channel extending across the bottom of the car which permits the wheels to follow dips in the track and avoid liability to derailment. If it should be desired to have a rigid truck for any reason, such as the top-heavy form or loading of the car body, fillers may be easily inserted in the channel above the axle or between the axle and the end straps.

Having thus described the invention, what is claimed as new is:

1. In a mine car truck, the combination of an axle, wheels mounted thereon, and a hanger plate disposed between the wheels over the axle and provided at its ends with resilient portions engaging the ends of the axle at the outer sides of the wheels.

2. In a mine car truck, the combination of an axle, wheels mounted upon the axle, and a hanger plate supported upon the ends of the axle at the outer sides of the wheels and provided between the wheels with a depending channel receiving the axle.

3. In a mine car truck, the combination of an axle, wheels mounted thereon, a hanger plate supported at its ends upon the axle at the outer sides of the wheels and provided between the wheels with a depending channel receiving the axle, and means carried by said hanger plate to retain the axle in said channel.

4. In a mine car truck, the combination of an axle, wheels mounted upon the axle, a hanger plate supported at its ends upon the axle at the outer sides of the wheels, webs depending from the intermediate portion of the hanger plate between the wheels at the opposite sides of the axle, and straps secured to the hanger plate and bridging the said webs below the axle.

5. In a mine car truck, the combination of a pair of axles, wheels mounted upon the axles, hanger plates supported upon the respective axles at the outer sides of the wheels and disposed over the axle between the wheels, means for preventing displacement of said hanger plates relative to the respective axles and permitting relative vertical movement of the axle and the intermediate portion of the respective hanger plate, and a coupling plate secured to and extending between said hanger plates.

6. In a mine car truck, the combination of a pair of axles, wheels mounted on the axles, hanger plates disposed above the respective axles and supported by the ends thereof at the outer sides of the wheels, means whereby a limited relative vertical movement of the hanger plates and the axles will be permitted, and flexible tie bars connecting the ends of the axles.

7. In a mine car truck, the combination of a pair of axles, wheels mounted thereon, hanger plates disposed above the respective axles and supported by the ends thereof at the outer sides of the wheels, means whereby a limited relative vertical movement of the hanger plates and the axles will be permitted, a coupling plate secured to and extending between the hanger plates, and flexible tie bars connecting the ends of the axles.

8. In a mine car truck, the combination of a pair of axles, wheels on the axles, channels disposed over the axles between the wheels, means whereby a limited free vertical relative movement of the axles and the channels will be permitted, and a coupling plate connecting the channels.

9. In a mine car truck, the combination of a pair of axles, wheels on the axles, channels disposed over the axles between the wheels, means whereby a limited relative movement of the axles and the wheels will be permitted, and flexible tie bars connecting the axles.

In testimony whereof I affix my signature.

JOHN M. CAMERON. [L. S.]